United States Patent [19]
Williamson et al.
[11] Patent Number: 4,529,512
[45] Date of Patent: Jul. 16, 1985

[54] HYDRAULIC RESERVOIR

[75] Inventors: William H. Williamson, Niles; Roger G. Slabaugh, Mishawaka, both of Ind.
[73] Assignee: Clark Equipment Company, Buchanan, Mich.

[21] Appl. No.: 437,601
[22] Filed: Oct. 29, 1982

Related U.S. Application Data

[62] Division of Ser. No. 225,598, Jan. 19, 1981, abandoned.

[51] Int. Cl.[3] B01D 27/10
[52] U.S. Cl. 210/120; 210/130; 210/136; 210/218; 210/349; 210/436
[58] Field of Search 210/87, 90, 188, 218, 210/349, 406, 436, 444, 120, 121, 123, 128, 440, 457, 130, 136, 137; 60/478, 415, 418, 453, 454; 138/30

[56] References Cited

U.S. PATENT DOCUMENTS

| | | | |
|---|---|---|---|
| 1,750,997 | 3/1930 | Feldmeier | 210/349 |
| 2,392,901 | 1/1946 | Brown | 210/188 |
| 2,472,717 | 6/1949 | Morey | 210/123 |
| 2,787,222 | 4/1957 | Thomas | 210/416.5 |
| 2,929,503 | 3/1960 | Ambruster, I et al. | 210/120 |
| 2,932,400 | 4/1960 | Scavuzzo | 210/436 |
| 3,063,470 | 11/1962 | Forster | 138/30 |
| 3,127,255 | 3/1964 | Winslon | 210/436 |
| 3,294,240 | 12/1966 | Korte | 210/349 |
| 3,421,628 | 1/1969 | Barnabe et al. | 210/349 |
| 3,493,496 | 2/1970 | Bray et al. | 210/349 |
| 3,512,645 | 5/1970 | Rosaen | 210/349 |
| 3,625,242 | 12/1971 | Ostwald | 138/30 |
| 3,744,527 | 7/1973 | Mercier | 138/30 |
| 3,893,485 | 7/1975 | Loukonen | 138/30 |
| 4,052,852 | 10/1977 | Hart | 60/478 |
| 4,146,485 | 3/1979 | Broad | 210/457 |
| 4,196,075 | 4/1980 | Bentley | 210/349 |
| 4,256,579 | 3/1981 | Rose et al. | 210/349 |
| 4,287,917 | 9/1981 | Frey | 210/349 |
| 4,432,393 | 2/1984 | Mills | 138/30 |

FOREIGN PATENT DOCUMENTS

| | | | |
|---|---|---|---|
| 515517 | 2/1955 | Italy | 210/406 |

*Primary Examiner*—Richard V. Fisher
*Assistant Examiner*—Wanda L. Millard
*Attorney, Agent, or Firm*—Kenneth C. Witt; John C. Wiessler

[57] ABSTRACT

A hydraulic system including a closed reservoir which is pressurized at a varying pressure that is responsive to a variable condition of the system. The system minimizes the air contained in the hydraulic fluid, causing air which has been released from the hydraulic fluid to collect in the reservoir which has provision for releasing it to the atmosphere.

10 Claims, 2 Drawing Figures

HYDRAULIC RESERVOIR

This application is a division of application Ser. No. 225,598, filed Jan. 19, 1981, now abandoned.

BACKGROUND OF THE INVENTION

1. Field of the Invention:

This invention relates to recirculating hydraulic systems in which a pump supplies pressure for the operation of a separately located hydraulic device. It is useful for the operation of hydraulic devices on construction machinery and the like although it is not limited to such usage.

2. Description of the Prior Art:

It is known that air is a contaminant in the hydraulic fluid for such systems, just as dirt, water and acid are. For an indepth discussion of this topic see the article entitled "Keeping Air Out of Hydraulic Systems" by Vincent G. Magorien in the Aug. 7, 1980 issue of Machine Design.

In Table 6 in the article the author shows vacuuming as one method of removing entrained and dissolved air from hydraulic fluid. However, it is not necessary to subject the hydraulic fluid to a vacuum to remove the air. By continually varying the hydraulic fluid pressure in the system while such pressure is always above atmospheric pressure it is possible to remove sufficient air from the hydraulic fluid to in large measure nullify its deleterious effects.

Our hydraulic system is similar to that disclosed in U.S. Pat. No. 4,052,852 Hart except that our system utilizes a continually varying super atmospheric pressure instead of the constant positive pressure of the Hart system.

An article in the BFPR Journal 1979, 12, 1, 59–63 of the Basic Fluid Power Research Program, Oklahoma State University, on page 62 discusses the use of low pressure start-up conditions to promote deaeration and the release of air from the system at the time of start-up. This invention provides for release of air from the hydraulic fluid during operation of the system and the discharge of such air from the system at the next start-up.

SUMMARY OF THE INVENTION

A hydraulic system having a closed reservoir and an external hydraulic circuit which includes a hydraulic pump for withdrawing fluid from the reservoir and for returning hydraulic fluid to the reservoir. The external circuit includes a hydraulic device arranged to be selectively actuated by the hydraulic fluid. In order to remove air from the hydraulic fluid there are provided means responsive to a condition of the hydraulic circuit for maintaining a varying superatmospheric pressure in the reservoir.

The hydraulic reservoir comprises a vertically disposed closed rigid tank having both inlet and outlet ports located in or near the bottom of the tank. A vertically disposed filter in the tank is arranged for hydraulic fluid entering the inlet port to move upwardly through it and outwardly to be filtered and then to be returned downwardly to the outlet port. The tank provides a quiescent zone at the top to collect air which is released from the hydraulic fluid.

DESCRIPTION OF THE PREFERRED EMBODIMENT

Figure 1:
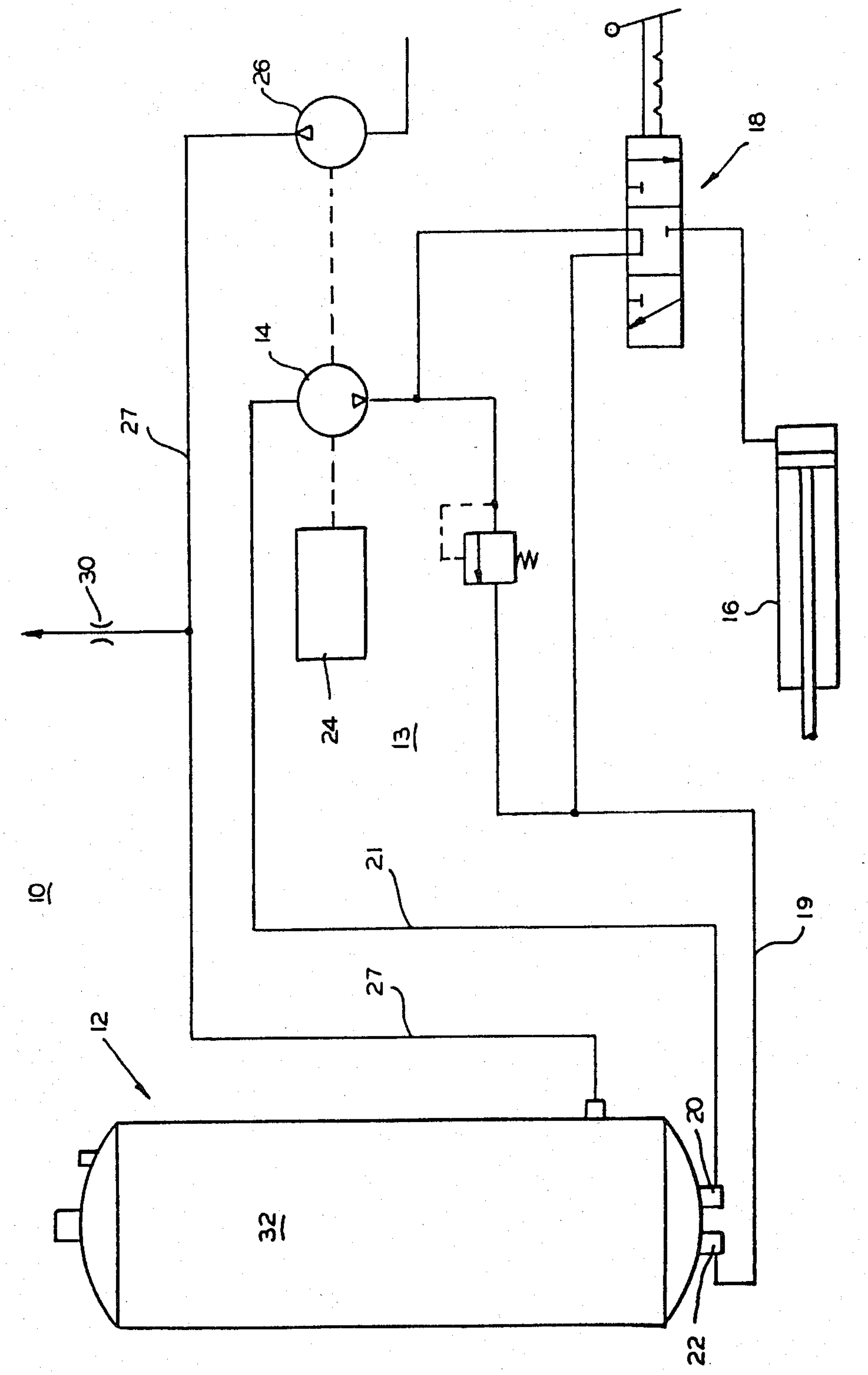
FIG. 1 of the drawing is a diagrammatic illustration of the hydraulic system of the present invention.

In FIG. 1 of the drawing the hydraulic system of this invention is indicated generally by the numeral 10. The system includes a closed hydraulic reservoir indicated generally at 12 and shown in detail in FIG. 2. Also included in the system is a hydraulic circuit 13 including a pump 14, a hydraulic device 16 and a valve 18 for operating the device 16 from the hydraulic pump. Hydraulic fluid is withdrawn from the reservoir 12 through outlet 20 and conduit 21 and after being circulated through the pump 14, the valve 18 and the device 16, is returned to the reservoir via conduit 19 and inlet 22.

As shown the pump 14 is driven by an engine 24 which varies in speed during operation and includes in its operating cycle intervals when the engine is idling or otherwise operating at a relatively low speed. This may be the prime mover of a construction machinery vehicle having one or more hydraulic devices such as device 16 which are operated during the work cycle of the machine, with the engine returning to idle speed between operations of the hydraulic device or devices.

Figure 2:
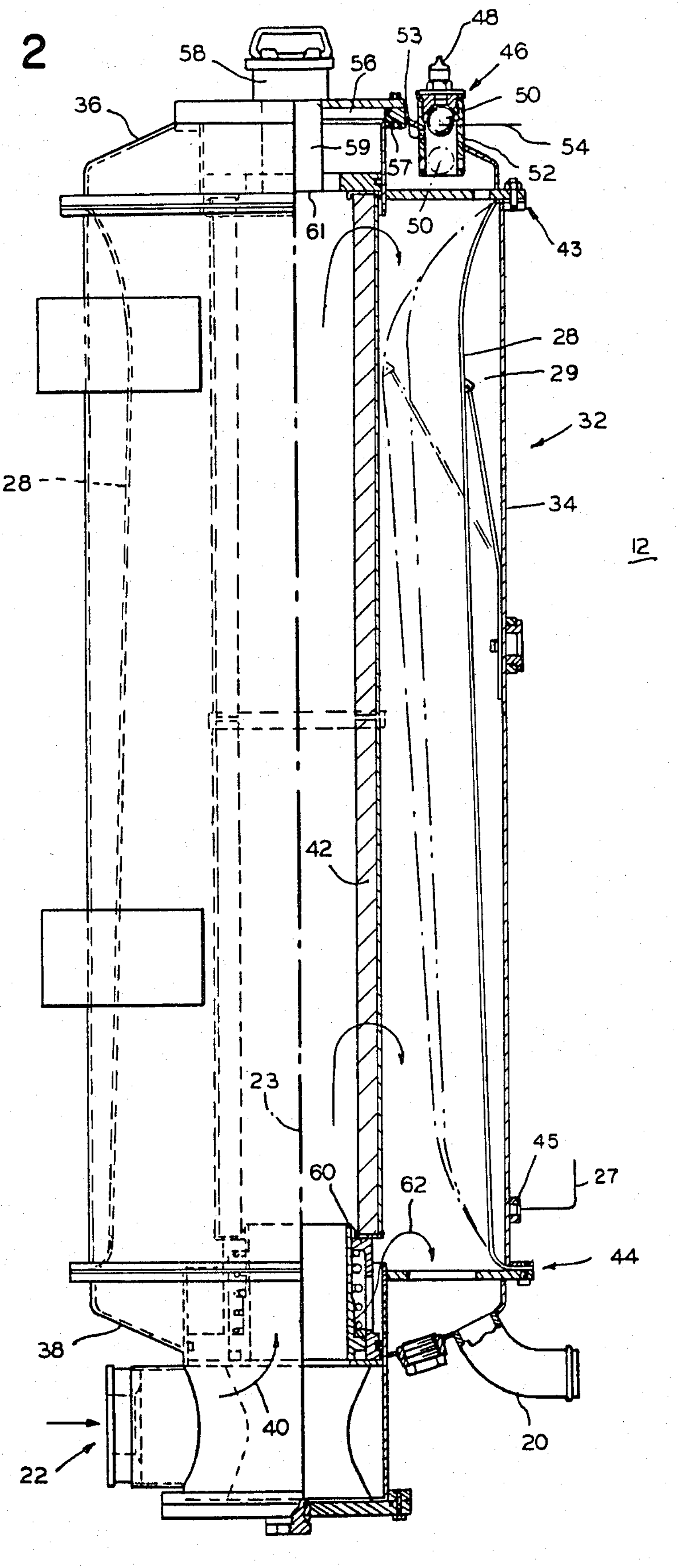
FIG. 2 is an elevational view partially in section showing the reservoir of the invention.

As shown, the engine 24 also operates an air pump 26 which is utilized to pressurize an annular variable volume chamber 29 formed in the reservoir by internal bladder 28 which can be seen in FIG. 2. The pressure applied to the chamber 29 and hence to the reservoir varies during the operating cycle of the engine 24 because of air pressure regulator 30. As disclosed the regulator 30 is an orifice which is connected in the air conduit 27 between air pump 26 and the chamber 29 to discharge a portion of the air delivered by the air pump and thereby vary the pressure in the chamber 29 as the speed of engine 24 and hence the speed of air pump 26 vary. The orifice 30 discharges an approximately constant volume of air regardless of the amount of air discharged by air pump 26, therefore, pressure in chamber 29 is lower when engine 24 is idling and air pump 26 is running at a low speed than when the engine and air pump are at a higher operational speed.

It will be appreciated that other known air pressure regulators may be utilized to provide a relatively low air pressure during one portion of the operating cycle of the system as compared to the air pressure during another portion of such cycle.

As shown in FIG. 2 the reservoir 12 comprises three principal structural parts joined together to form a single rigid closed tank 32, the three parts including a central cylindrical portion 34, a top cap portion 36 and a bottom cap portion 38. The tank 32 is vertically disposed in accordance with the invention and the inlet port 22 as indicated by the arrow 40 provides for the entry of hydraulic fluid into the tank about the vertical center line 23 of the tank. A filter 42 for the hydraulic fluid which is shown as annular or cylindrical in form, is directly above the inlet to the tank and also is symmetrical with respect to the center line 23. The flow of hydraulic fluid through the reservoir generally is up through the center of filter 42, outwardly through the filter and then downwardly outside the filter to outlet 20 at the bottom of the tank.

The reservoir is equipped with a flexible bladder 28 which is sealed at the top and bottom of cylindrical portion 34 as indicated at 43 and 44 to provide annular air chamber 29 in the reservoir when it is inflated. An air connection is provided at 45 which connects to conduit 27 from the air pump 26 and regulator 30. The bladder 28 expands towards the center of the reservoir and contracts back toward the outer wall as the air pressure rises or falls respectively and provides a variable volume air chamber 29 in the reservoir. The pressure exerted by the air applies the same pressure to the hydraulic fluid in the reservoir.

The reservoir 12 is equipped at the top with a multipurpose check valve assembly which is indicated generally by the numeral 46. It includes a conventional air check valve 48 which is arranged to prevent air from entering the reservoir but permits air to leave providing ball check 50 is at a position low enough in its tubular housing 52 to permit air to flow around the ball and out the check valve. The normal operating position of ball check 50 is as indicated in solid lines in FIG. 2, when the level of the hydraulic fluid in the reservoir is at the line indicated at 54. The ball check 50 floats up and down in housing 52 on top of the hydraulic fluid and when, during normal operation of the system, it is at the uppermost position as indicated in solid lines it seals the check valve assembly 46 against the discharge of both air and hydraulic fluid. When the system is shut down and during start-up the ball check 50 is at a lower level such as indicated in the dot-dash lines in FIG. 2. During normal operating conditions air is trapped above the level 54 in a quiescent zone as indicated at 56. A filler port 58 may be provided at the top to fill the hydraulic system initially and replenish hydraulic fluid as may be required.

The reservoir may be provided with a known type of by-pass valve 60 between inlet port and the filter to adapt the reservoir for cold weather conditions. When the temperature is low and the hydraulic fluid is sufficiently viscous the by-pass valve 60 opens and by-passes hydraulic fluid as indicated by the arrow 62 so that it does not flow through the filter. When the hydraulic fluid has warmed up sufficiently for normal operation the by-pass valve closes again and the reservoir thereafter operates normally.

As pointed out in the previously mentioned Machine Design article cavitation is the most common problem arising out of air contained in hydraulic fluid. Cavitation is a problem with most all types of pumps, including gear and vane types, but is an especially difficult problem with piston type pumps. Such article infers that it is necessary to have a vacuum around the pumping elements in order to have cavitation but it is believed that such is not the case. Instead, it is believed that cavitation is caused not by the absolute pressure at the pump inlet but by the pressure drop between the reservoir and the pump inlet. There is such a pressure drop when the system is in operation because of the restriction to flow in conduit 21 connecting the reservoir outlet and the pump inlet. The amount of the pressure drop is dependent upon the size and configuration of such conduit. As the hydraulic fluid travels toward the pump, the reduction in pressure draws dissolved air out of the fluid, and it enters the pump as bubbles. Similarly, entrained air bubbles increase in size with this pressure reduction.

The preceding paragraph assumes that the hydraulic fluid is fully saturated with air. At any designated pressure the hydraulic fluid is capable of containing a certain maximum amount of air, and when it contains that amount it is saturated. The amount of air required for saturation becomes greater as the pressure increases and becomes less as the pressure decreases. Assuming there are no air leaks in the hydraulic system, the air causing saturation usually comes from air pockets that are always found somewhere in the hydraulic system. Air from these pockets eventually washes into the fluid and becomes dissolved or entrained. Reference herein to air contained in the hydraulic fluid includes both air which is dissolved and air which is entrained in such fluid.

In order to understand the operation of the hydraulic system 10 assume that the engine 24 and the associated hydraulic circuit, including pump 14, hydraulic device 16 and valve 18, as well as reservoir 12 and conduit 21, have two operating conditions. One is when the engine is operating at a high speed to provide a large volume flow through the hydraulic circuit to facilitate the operation of device 16. The other is when device 16 is not being operated and the engine is running at a low speed which produces a small volume flow of hydraulic fluid in the hydraulic circuit. Under these conditions the reservoir may have an internal pressure of 10 psi (69 kPa) at high engine speed and 5 psi (34 kPa) at low engine speed. This variation in hydraulic fluid pressure is provided by the air system and variable volume chamber as previously described, the air pump 26 and regulator 30 being responsive to engine speed. At high engine speed there may be an approximately 2 psi (14 kPa) pressure drop between the reservoir 12 and pump 14 as hydraulic fluid flows through conduit 21, whereas at low engine speed, because of the much smaller flow in the hydraulic circuit, the pressure drop between the reservoir and pump is negligible although there is, of course, a small pressure drop.

When the hydraulic system has been operated for a time with conditions varying between high engine speed and low engine speed the saturation pressure in the hydraulic fluid will reach approximately 5 psi, that is, the hydraulic fluid will contain approximately the amount of air it could contain if the system pressure were held at a constant 5 psi. However, the pressure in the reservoir is 10 psi at full engine speed, and under this condition, with a 2 psi pressure drop between the reservoir and the fluid pump, the pump inlet pressure will be 8 psi. This 8 psi is above the 5 psi saturation pressure of the hydraulic fluid, and therefore no significant amount of air will be drawn out of the hydraulic fluid as it passes through the pump. All hydraulic fluid pressures specified are above atmospheric.

With this system, every time the engine 24 is stopped and the system shut down air pressure is removed from the reservoir, whereupon the weight of the hydraulic fluid causes a slight vacuum in the hydraulic fluid thereby reducing the reservoir pressure and drawing air out of the hydraulic fluid. When the system is started up again this air plus that previously released from the hydraulic fluid during operation is automatically discharged through check valve assembly 46 until the hydraulic fluid level reaches normal operating level 54.

The configuration of reservoir 12 assists in removing air which is contained in the hydraulic fluid as it passes through the reservoir during operation of the system. Fluid flow through the filter 42 is not uniform. The flow rate near the bottom of the filter is relatively high and at the top of the filter is almost nonexistent. This means that the closer an air bubble gets to the top of the reservoir, the less flow force there is attempting to force it through the filter. Looking at the fluid flow path through the reservoir, the incoming fluid is directed upwardly in a vertical column through the inside of the filter. If there are randomly distributed air bubbles in this column of fluid, the bubbles near the center will rise the highest before attempting to pass through the filter. At a point somewhere above the mid-line of the filter, the flow forces are low enough that the air bubbles attach themselves to the filter, where they coalesce to the point they are buoyant enough to rise to the top. This means that the air bubbles are continuously being stripped from the fluid.

The air which is released from the hydraulic fluid collects in the quiescent zone 56 at the top of the reservoir. The quiescent zone 56 communicates with the interior of housing 52 by means of a passageway 57 and an opening 53 in housing 52 to allow the passage of air from zone 56 to assembly 46. This arrangement permits the discharge of air from the reservoir 12 through assembly 46, upon start-up of the system, until the hydraulic operating fluid reaches normal operating level 54.

One of the advantages of making reservoir 12 a pressure vessel is that it permits the use of thinner material in the outer shell, which enhances heat transfer and thus assists in cooling the hydraulic system. Also, by using a stand pipe 59 in the fill port, as shown in FIG. 2, a certain amount of air is trapped in the reservoir when it is filled with fluid initially, such amount being determined by the extent to which the lower margin 61 of stand pipe 59 projects downwardly into the tank 32. When the system is started this air is expelled and the bladder inflates slightly to fill this void. This allows for thermal expansion of the fluid as the system heats up to normal operating temperature without the necessity of dumping any excess fluid through the check valve assembly 46.

While we have illustrated and described herein the best mode contemplated for carrying out our invention it will be appreciated that modifications may be made. Accordingly, it should be understood that we intend to cover by the appended claims all such modifications which fall within the true spirit and scope of our invention.

We claim:

1. A hydraulic reservoir comprising:

a vertically disposed closed cylindrical tank for storing hydraulic fluids and having a vertically disposed axis, means defining an inlet port in the bottom of said tank which is coaxial with said axis, a vertically disposed filter having means defining a vertically disposed opening entirely through it located in said tank and arranged for hydraulic fluid entering said inlet port to move upwardly through said opening and outwardly through said filter to be filtered, said filter arranged so that some of the air carried by the hydraulic fluid is released from the hydraulic fluid as it moves upwardly through said vertically disposed opening, means defining a quiescent zone at the top of said tank above said vertically disposed opening for receiving and storing air which is released from the hydraulic fluid, and means defining an outlet port in said tank for discharging the filtered hydraulic fluid.

2. A hydraulic reservoir as in claim 1 having means in the top for releasing air from said quiescent zone when the hydraulic fluid level in the tank drops below a predetermined amount.

3. A hydraulic reservoir as in claim 2 including a variable volume air chamber in said tank.

4. A hydraulic reservoir as in claim 3 in which said variable volume air chamber is formed by an internal bladder in said tank.

5. A hydraulic reservoir as in claim 4 in which said tank comprises a central cylindrical portion, a top cap portion and a bottom cap portion, and the upper and lower extremities of said bladder are sealed respectively between said top cap portion and said central portion, and said central portion and said bottom cap portion, whereby said bladder forms with said central portion an annular variable volume air chamber.

6. A hydraulic reservoir as in claim 2 wherein said means for releasing air comprises a ball check floating on said hydraulic fluid.

7. A hydraulic reservoir as in claim 1 wherein said inlet port is symmetrical about the axis of said tank.

8. A hydraulic reservoir as in claim 7 wherein said filter is annular and is symmetrical about said axis.

9. A hydraulic reservoir as in claim 1 wherein said tank is provided with a filler port near the top, and said filler port is equipped with a stand pipe extending downwardly into the tank to make certain that at least a predetermined amount of air is trapped in the tank when it is filled with hydraulic fluid.

10. A hydraulic reservoir as in claim 1 wherein a by-pass valve is located between said inlet port and said filter.

* * * * *